UNITED STATES PATENT OFFICE.

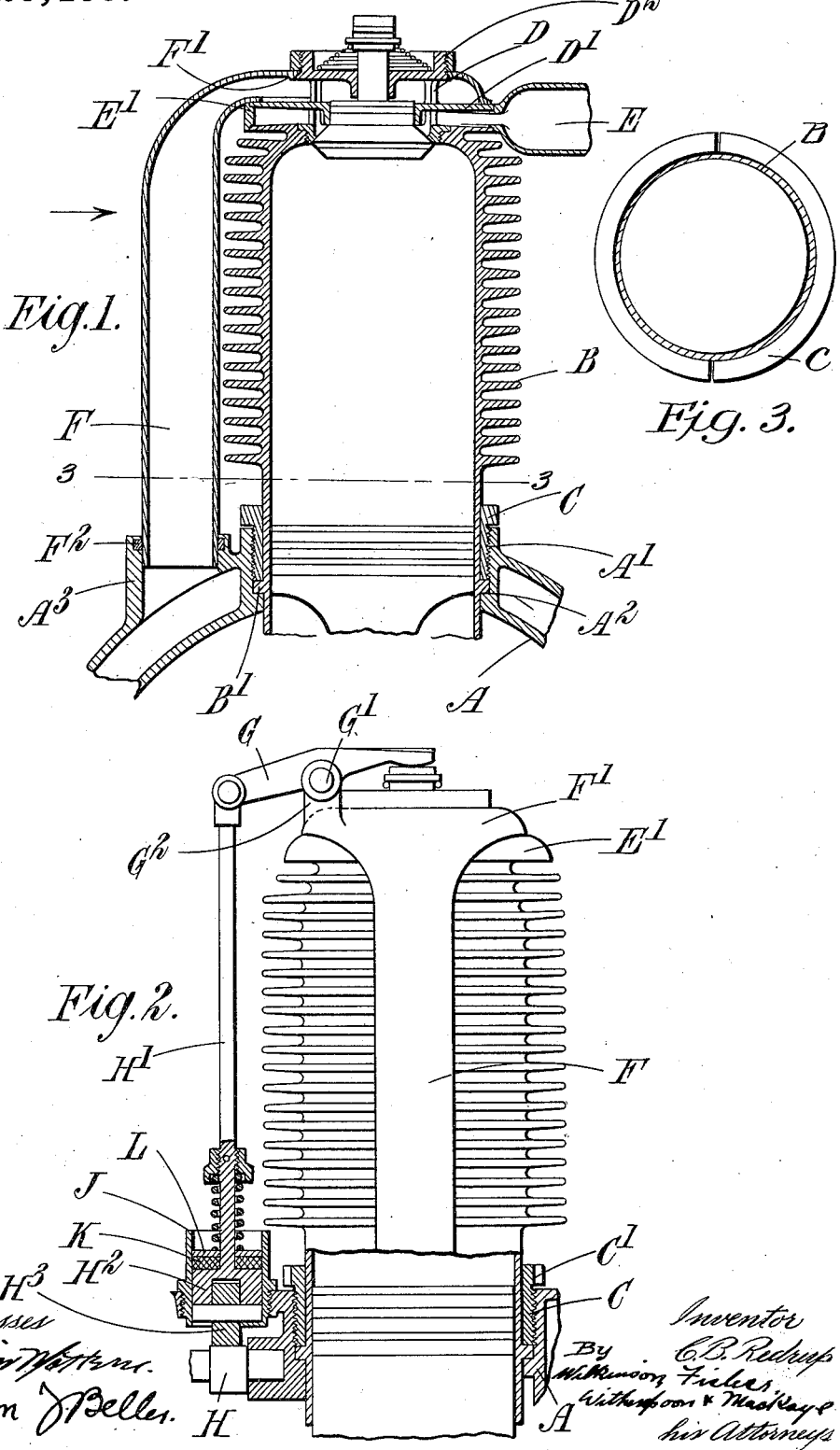

CHARLES BENJAMIN REDRUP, OF CARDIFF, ENGLAND.

FLUID-PRESSURE ENGINE.

1,029,460.　　　　　　　Specification of Letters Patent.　　　Patented June 11, 1912.

Application filed June 15, 1911. Serial No. 633,334.

*To all whom it may concern:*

Be it known that I, CHARLES BENJAMIN REDRUP, a subject of the King of England, residing at Cardiff, county of Glamorgan, Wales, England, have invented certain new and useful Improvements in Fluid-Pressure Engines, of which the following is a specification.

This invention is for improvements in or relating to fluid-pressure engines of the internal combustion type and has for its object to provide means whereby the cylinder can be readily attached or detached from the crank case which necessitates some means for readily attaching and detaching the induction and exhaust conduits either from the cylinder or from the other parts to which they are connected and similarly readily attaching or detaching the valve operating mechanism.

The main feature of this invention consists in employing a readily detachable locking device for an engine cylinder whereby the latter can be secured to its crank-chamber without bolts and nuts such as are usually employed. Preferably the locking device takes the form of a divided nut.

A shouldered orifice may be provided in the crank-chamber to receive the cylinder and a corresponding shoulder formed on the cylinder.

Another feature of the invention consists in the employment with a cylinder which is readily detachable from its crank-chamber of an induction pipe that is held by the cylinder in fluid tight connection with the crank-chamber or a part carried thereby.

The invention further consists in employing with a cylinder that is readily detachable an induction pipe having its valve end spread out approximately to the shape of a cap or ring and a clamping device for securing and completing the walls of such end portion of the conduit. A valve may be mounted in the inclosure formed by the end of the conduit.

Other features of this invention will be described with reference to the accompanying drawings which show one method of carrying the present invention into effect, the novel features being pointed out in the claims.

Figure 1 is a central vertical section of the engine cylinder; and Fig. 2 is an elevation of the cylinder viewed from the left of Fig. 1, showing the valve operating mechanism in section. Fig. 3 is a reduced, detail section on the line 3—3 of Fig. 1.

Like letters indicate like parts throughout.

A crank-chamber A has a screw-threaded orifice A' to receive the end of a cylinder B. The orifice A' is shouldered at A² and on this shoulder rests a shoulder B' formed near the end of the cylinder B. A divided ring nut C C' surrounds the cylinder and screws into the screw-threaded portion of the orifice to grip the flange B' between its lower edge and the flange A². The nut C—C' is divided on a diametrical plane, for permitting ready positioning thereof on the cylinder B above the cylinder flange B'; the two halves of said divided nut being firmly confined together when screwed in the threaded orifice A'.

It will be seen that the cylinder can be removed from its crank-chamber after unscrewing the single divided ring nut C C'.

It is well-known that ordinarily to remove an engine cylinder from its crank-chamber it is necessary to disconnect the induction pipe from the head of the cylinder and in some cases the valve-operating mechanism, besides unscrewing the usual nuts. To dispense with these operations, the parts are arranged as follows:—The induction conduit F is clamped in a manner hereinafter described to the head of the cylinder; the lower end of the conduit F fits into a socket A³ formed on a portion of the crank-chamber which has communication with the carbureter (not shown in the drawings). A packing ring F² is provided to prevent escape of gas.

The exhaust valve is mechanically operated by a rocking arm G pivoted at G' to a lug G² on the induction pipe. A cam H for opening the valve is situated in the crank-chamber A and communicates its motion to the rocking arm G by means of a rod H'. The rod H' has an enlarged head H² and carries the roller H³ which coöperates with the cam H. The head H² is of greater diameter than the roller H³. A tube J is screwed into the crank-chamber A and forms a guide-way for the head H². A packing ring K prevents escape of oil from the crank-chamber the packing being compressed by means of a spring-controlled plate L.

It will be appreciated that to remove the cylinder together with its associated parts from the crank-chamber, it is only necessary to unscrew the single divided nut C C'. The induction conduit F will be drawn out of its socket A³ as it is held in position by the cylinder and likewise the valve-rod head H² carrying the roller H³ will also be withdrawn from its tube J; the head H being of greater diameter than the roller, allows the latter to pass through the socket. This constitutes a simple device whereby an engine cylinder can be quickly detached from its crank-chamber and the space occupied by it is small, so that it is particularly suitable for engines of the type wherein a number of cylinders are secured radially around the crank-chamber which revolves with its cylinders. Engines of this type are largely used for aeroplanes.

The inlet valve is of the automatic type and is concentric with the exhaust valve. The valves are contained in a cylindrical valve-casing D which is screwed into the head of the cylinder B and has a central flange D'. An exhaust conduit E has its valve-end E' spread out in the form of a ring and this portion E' is clamped between the flange D' and the top of the cylinder. Likewise the valve-end F' of the induction conduit F is spread out in the form of a cap having a central orifice that takes over the top of the cylindrical valve-chamber; a nut D² screws on the valve-casing and clamps the conduit thereto. It will be seen that the valve-casing together with its flange complete the walls of the end portions of the exhaust and induction conduits.

It will be noticed that ring-nuts are employed throughout for clamping the different parts of the apparatus together; the form of the nuts varying slightly to suit their requirements.

What I claim as my invention and desire to secure by Letters Patent is:—

1. In a fluid-actuated motor, the combination of a power cylinder provided with a shoulder, a crank chamber provided with a threaded orifice constituting a seat for said shoulder, and a divided nut for clamping said cylinder shoulder on said seat.

2. In a fluid-actuated motor provided with a power cylinder and crank chamber, the combination of an inlet pipe for the cylinder, and a common detachable means for clamping said cylinder and inlet pipe to the crank chamber.

3. In a fluid-actuated motor, the combination of a power cylinder provided with a shoulder, an inlet pipe secured to said cylinder, a crank chamber provided with a socket constituting a seat for said inlet pipe and with a threaded orifice constituting a seat for said cylinder shoulder, and a divided nut on said cylinder adapted to be screwed into such threaded orifice for firmly clamping said cylinder and inlet pipe on said chamber.

In testimony whereof I have signed my name to this specification in the presence of two subscribing witnesses.

CHARLES BENJAMIN REDRUP.

Witnesses:
A. M. HAYWARD,
HARRY B. BRIDGE.

Copies of this patent may be obtained for five cents each, by addressing the "Commissioner of Patents, Washington, D. C."